US012811900B2

(12) United States Patent
Lee et al.

(10) Patent No.: US 12,811,900 B2
(45) Date of Patent: Nov. 24, 2026

(54) METHOD AND APPARATUS FOR INSTANT MESSAGING SERVICE

(71) Applicant: KAKAO CORP., Jeju-si (KR)

(72) Inventors: Jae Seon Lee, Seongnam-si (KR); Hyun Ju Ha, Seongnam-si (KR); Jin Lee, Seongnam-si (KR); Jae Jun Ryu, Seongnam-si (KR); Jae Moon Shin, Seongnam-si (KR); Soo Hyun Park, Seongnam-si (KR); Song Hyun Kim, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 49 days.

(21) Appl. No.: 18/941,984

(22) Filed: Nov. 8, 2024

(65) Prior Publication Data

US 2025/0158944 A1 May 15, 2025

(30) Foreign Application Priority Data

Nov. 13, 2023 (KR) ........................ 10-2023-0156576

(51) Int. Cl.
*H04L 51/046* (2022.01)
*H04L 51/10* (2022.01)
(Continued)

(52) U.S. Cl.
CPC ............ *H04L 51/046* (2013.01); *H04L 51/10* (2013.01); *H04L 12/1813* (2013.01);
(Continued)

(58) Field of Classification Search
CPC ..... H04L 51/04; H04L 51/043; H04L 51/046; H04L 51/222; H04L 51/52; H04L 65/403;
(Continued)

(56) References Cited

U.S. PATENT DOCUMENTS 6,487,495 B1 * 11/2002 Gale ........................ G06F 16/29 701/461
7,188,143 B2 * 3/2007 Szeto ...................... H04L 51/04 709/227
(Continued)

FOREIGN PATENT DOCUMENTS

AU 2021100476 A4 * 4/2021 ........... H04L 51/046
CA 3124596 A1 * 6/2019 .............. H04W 4/60
(Continued)

OTHER PUBLICATIONS

Lian, GeoChat on iPhone A Map-based Chat Application on iPhone, September (Year: 2010).*
(Continued)

*Primary Examiner* — Oscar A Louie
(74) *Attorney, Agent, or Firm* — Seed Intellectual Property Law Group LLP

(57) ABSTRACT

Disclosed are a method and apparatus for an instant messaging service. An operating method of a server that provides an instant messaging service includes receiving a request for a local chat page through an instant messenger, transmitting a query based on the meta information of the local chat page to a map server, generating a map view based on local map information received from the map server in response to the query, generating a chat view based on chat information linked with the local chat page, and providing the local chat page including the map view and the chat view to a terminal having executed the instant messenger.

20 Claims, 9 Drawing Sheets

(51) Int. Cl.

| | |
|---|---|
| ***H04L 51/216*** | (2022.01) |
| ***H04L 51/52*** | (2022.01) |
| ***H04L 65/403*** | (2022.01) |
| *H04L 12/18* | (2006.01) |

(52) U.S. Cl.
CPC ............ *H04L 51/216* (2022.05); *H04L 51/52* (2022.05); *H04L 65/403* (2013.01)

(58) Field of Classification Search
CPC .... H04L 12/1813; H04W 4/02; H04W 4/021; H04W 4/025; H04W 4/029
See application file for complete search history.

(56) References Cited

U.S. PATENT DOCUMENTS

| | | | | |
|---|---|---|---|---|
| 7,467,181 | B2 * | 12/2008 | McGowan | G06Q 10/107 709/202 |
| 7,814,152 | B2 * | 10/2010 | McGowan | H04L 67/14 715/752 |
| 8,843,835 | B1 * | 9/2014 | Busey | H04L 12/1813 715/854 |
| 9,247,386 | B2 * | 1/2016 | Kau | H04L 67/52 |
| 10,939,246 | B1 * | 3/2021 | Dancie | H04M 1/7243 |
| 11,570,133 | B1 * | 1/2023 | Lamba | H04L 51/046 |
| 2002/0007396 | A1 * | 1/2002 | Takakura | H04W 4/029 715/753 |
| 2007/0271340 | A1 * | 11/2007 | Goodman | G06Q 10/107 709/206 |
| 2007/0271367 | A1 * | 11/2007 | Yardeni | H04L 67/52 709/206 |
| 2009/0106040 | A1 * | 4/2009 | Jones | G06Q 30/02 705/319 |
| 2009/0254840 | A1 * | 10/2009 | Churchill | H04L 51/04 715/753 |
| 2010/0030740 | A1 * | 2/2010 | Higgins | H04W 4/024 707/E17.014 |
| 2010/0293104 | A1 * | 11/2010 | Olsson | H04L 12/1818 707/E17.107 |
| 2012/0124147 | A1 * | 5/2012 | Hamlin | H04L 51/08 709/206 |
| 2012/0166281 | A1 * | 6/2012 | Sartipi | H04W 4/029 705/14.54 |
| 2013/0262591 | A1 * | 10/2013 | Beslic | H04N 21/4788 709/206 |
| 2014/0215588 | A1 * | 7/2014 | Sayed | H04W 4/12 455/456.3 |
| 2016/0036735 | A1 * | 2/2016 | Pycock | H04L 51/04 709/206 |
| 2016/0210357 | A1 * | 7/2016 | Wohltman | G06F 16/9537 |
| 2016/0371791 | A1 * | 12/2016 | Lee | G06Q 10/40 |
| 2017/0032021 | A1 * | 2/2017 | Watanachote | H04L 51/52 |
| 2017/0289074 | A1 * | 10/2017 | Joo | H04L 67/52 |
| 2018/0067940 | A1 * | 3/2018 | Shin | G06F 16/332 |
| 2018/0287982 | A1 * | 10/2018 | Draeger | H04L 51/216 |
| 2018/0367483 | A1 * | 12/2018 | Rodriguez | H04L 65/60 |
| 2019/0155459 | A1 * | 5/2019 | Chen | G06Q 10/107 |
| 2021/0409363 | A1 * | 12/2021 | Neumann | H04L 51/02 |
| 2022/0245338 | A1 * | 8/2022 | Yoo | G06F 40/103 |
| 2023/0208789 | A1 * | 6/2023 | Jo | H04L 51/04 709/206 |
| 2023/0308406 | A1 * | 9/2023 | Kwon | H04L 51/046 |

FOREIGN PATENT DOCUMENTS

| | | | | | |
|---|---|---|---|---|---|
| CN | 109120516 | A | * | 1/2019 | H04L 51/222 |
| EP | 1950984 | A1 | * | 7/2008 | H04W 4/024 |
| KR | 100431151 | B1 | * | 5/2004 | G06Q 10/40 |
| KR | 10-2013-0093345 | A | | 8/2013 | |
| KR | 10-2017-0075610 | A | | 7/2017 | |
| KR | 20220133538 | A | * | 10/2022 | G06Q 10/40 |
| KR | 20250059152 | A | * | 5/2025 | G06Q 30/0241 |
| WO | WO-2018155976 | A1 | * | 8/2018 | H04L 51/046 |

OTHER PUBLICATIONS

Schilit et al., Context-Aware Computing Applications, IEEE (Year: 1995).*

Cao et al. (An instant messaging system based on Google Map), IEEE (Year: 2010).*

Churchill et al. (MapChat: Conversing in Place), CHI (Year: 2008).*

Kim, "Hana Tour Launches Open Chat App for Real-Time Travel Information Exchange," Straight News, retrieved from URL=https://www.straightnews.co.kr/news/articleView.html?idxno=236020, Aug. 16, 2023 [with English Translation]. (2 pages).

* cited by examiner

303

502

METHOD AND APPARATUS FOR INSTANT MESSAGING SERVICE

CROSS-REFERENCE TO RELATED APPLICATION(S)

This application claims the priority benefit of Korean Patent Application No. 10-2023-0156576 filed on Nov. 13, 2023, in the Korean Intellectual Property Office, the disclosure of which is incorporated herein by reference for all purposes.

BACKGROUND

1. Field

One or more embodiments relate to a method and apparatus for an instant messaging service.

2. Description of Related Art

Recently, with the development of mobile smart devices, the use of an online platform service to communicate with other users via a network has increased. The online platform services for interaction with other users may include, as representative examples, a social networking service (SNS), which is an online platform for generating and consolidating social relationships through communication among users, information sharing, and expansion of personal connections, and an instant messaging service (IMS), which is an online platform for real-time content communication between two or more users. With the increase in communication via mobile devices, the development of technology for online platform services providing not only one-to-one communication with other users but also various forms of communication is required.

SUMMARY

Aspects provide a region-based instant messaging service for performing a chat related to a region together with information on map and place objects about the region.

However, technical aspects are not limited to the foregoing aspects, and there may be other technical aspects.

According to an aspect, there is provided an operating method of a server that provides an instant messaging service including receiving a request for a local chat page through an instant messenger; transmitting a query based on the meta information of the local chat page to a map server; generating a map view based on local map information received from the map server in response to the query; generating a chat view based on chat information linked with the local chat page; and providing the local chat page including the map view and the chat view to a terminal having executed the instant messenger.

The transmitting of the query to the map server may include generating the query to request the local map information corresponding to at least one of local information, local level information, place type information, and place ranking criterion information, based on the meta information.

The generating of the map view may include generating the map view including at least one of a map chart of a region corresponding to the local chat page, the information of a place object positioned in the region, and the ranking information of the place object positioned in the region.

The generating of the chat view may include determining a target chatroom based on the chat information linked with the local chat page and generating the chat view including information on the target chatroom.

The determining of the target chatroom may include determining the target chatroom based further on the chat participation history of a user account; determining a chatroom mapped to the local chat page as the target chatroom; and determining a chatroom, including local information corresponding to the local chat page as a keyword, as the target chatroom.

The generating of the chat view may include generating the chat view including a message transmitted through a chatroom linked with the local chat page.

The generating of the chat view may include at least one of generating the chat view in which messages transmitted in a chatroom linked with the local chat page are sorted in order of the most recently transmitted messages and generating the chat view in which the messages transmitted in a chatroom linked with the local chat page are sorted in order of importance.

According to another aspect, there is provided an operating method of a terminal configured to execute an instant messenger including requesting a local chat page from a server through the instant messenger and displaying the local chat page, including a chat view and a map view, received from the server. The map view may be generated based on local map information received corresponding to a query by transmitting the query based on the meta information of the local chat page to a map server, and the chat view may be generated based on chat information linked with the local chat page.

The requesting of the local chat page may include requesting the local chat page through an input of selecting an interfacing object for the local chat page in the instant messenger.

The requesting of the local chat page may include requesting the local chat page through an interfacing object provided based on whether the position of the terminal corresponds to the local chat page.

According to another aspect, there is provided a server that provides an instant messaging service including a processor configured to receive a request for a local chat page through an instant messenger, transmit a query based on the meta information of the local chat page to a map server, generate a map view based on local map information received from the map server in response to the query, generate a chat view based on chat information linked with the local chat page, and provide the local chat page including the map view and the chat view to a terminal having executed the instant messenger.

When transmitting the query to the map server, the processor may generate the query to request the local map information corresponding to at least one of local information, local level information, place type information, and place ranking criterion information, based on the meta information.

When generating the map view, the processor may generate the map view comprising at least one of a map chart of a region corresponding to the local chat page, the information of a place object positioned in the region, and the ranking information of the place object positioned in the region.

When generating the chat view, the processor may determine a target chatroom based on the chat information linked with the local chat page and may generate the chat view including information on the target chatroom.

When determining the target chatroom, the processor may determine a chatroom mapped to the local chat page as the target chatroom and may determine a chatroom, including local information corresponding to the local chat page as a keyword, as the target chatroom.

When determining the target chatroom, the processor may determine the target chatroom based further on the chat participation history of a user account.

When generating the chat view, the processor may generate the chat view comprising a message transmitted through a chatroom linked with the local chat page.

When generating the chat view, the processor may generate the chat view in which messages transmitted in a chatroom linked with the local chat page are sorted in order of the most recently transmitted messages and may generate the chat view in which the messages transmitted in a chatroom linked with the local chat page are sorted in order of importance.

When receiving the request for the local chat page, the processor may receive an input of selecting an interfacing object for the local chat page in the instant messenger.

DETAILED DESCRIPTION

Figure 1:
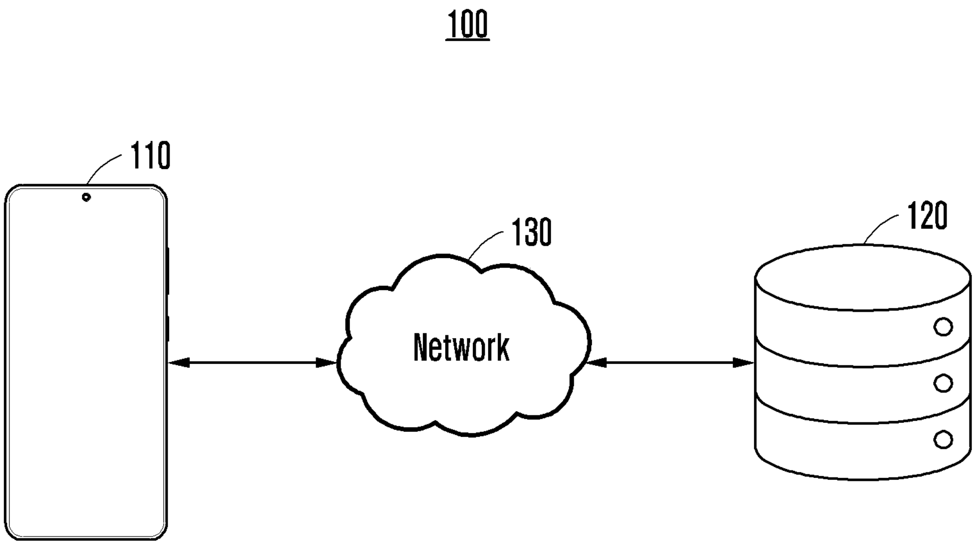
FIG. 1 is a diagram illustrating a system for an instant messaging service according to an embodiment.

The following detailed structural or functional description is provided as an example only and various alterations and modifications may be made to embodiments. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating a system for an instant messaging service according to an embodiment.

Referring to FIG. 1, a system 100 for the instant messaging service according to an embodiment may include a terminal 110, a server 120, and a network 130. The detailed hardware configurations of the server 120 and the terminal 110 are described below.

The server 120 may include a server that provides the instant messaging service through the network 130. The instant messaging service may include a service allowing a plurality of users to chat in real time by transmitting text messages, voice messages, media files, and other instant messages through the network 130, such as wireless Internet or a wireless communication network, and services related thereto. For example, the server 120 may include the server that provides the instant messaging service for a local chat page, which is a page including local chat information or chat information related to a region. The instant messaging service for the local chat page is described in detail below.

According to an embodiment, the server 120 may include a server that provides a position-based service through the network 130. The position-based service may be a service that provides various functions for providing a position or a path based on a position and a map. One or more place objects for the position-based service may be registered in the server 120. A place object is a data unit for identifying a place registered in the server 120. For example, the place object may include at least one of the type or category (e.g., a restaurant, a cafe, a beauty salon, a park, etc.) of the place, a name, an address, a phone number, the rating information of a user about the place, and the description information of the place.

For example, the server 120 may include an map server that provides the instant messaging service and the position-based service. In other words, the server 120 may include two or more different servers that provide the instant messaging service and the position-based service, respectively. For example, the server 120 may be one server that provides the instant messaging service and the position-based service. In other words, the instant messaging server may be the same as the map server that provides the position-based service or a separate server. When the instant messaging server is the same as the map server that provides the position-based service, the server 120 may refer to a server that provides both the instant messaging service and the position-based service. When the instant messaging server is different from the map server that provides the position-based service, the server 120 may refer to the instant messaging server and/or the map server.

The server 120 may be linked with a web for the instant messaging service or an application (hereinafter, the app) for the instant messaging service executed by the terminal 110 to provide a user interface (UI), a function, an operation, or a service. Hereinafter, the web for the instant messaging service or the app for the instant messaging service may be referred to as an instant messenger.

The server 120 may be linked with a web for the position-based service or an application (hereinafter, the app) for the position-based service executed by the terminal 110 to provide a user interface (UI), a function, an operation, or a service. Hereinafter, the web for the position-based service or the app for the position-based service may be referred to as a map app. For example, the map app may be linked with the instant messaging service.

The terminal 110 may be one of electronic apparatuses, such as a computer, a portable computer, a wireless phone, a mobile phone, a smartphone, a personalized digital assistant (PDA), a web tablet, and a wearable device, and may refer to any apparatus that may install and execute an app or may execute a web. In this case, the terminal 110 may be provided with services and/or content through an app or a web. For example, through the control of an app or a web, the terminal 110 may perform overall service operations, such as service screen setting, data input, data transmission and reception, and data storage. For example, the terminal 110 may process a user interface or user interaction through a processor and may output a processing result through an output device of the terminal 110 or transmit the processing result.

An instant messenger provided by the server 120 may drive the terminal 110. A user may use the instant messaging service provided by the server 120 by executing the instant messenger in the terminal 110. The user may generate a user account by subscribing to the instant messaging service through the instant messenger. The user may use the instant messaging service through the terminal 110 of the user account subscribing to the instant messaging service. The terminal 110 of the user account may be a terminal logging in with the user account generated by subscribing to the instant messaging service.

According to an embodiment, a chat interface may be provided to the terminal 110 through the app for the messaging service. The chat interface may be an interface for a message transmission/reception function provided by the messaging service and may include, for example, an interface that provides a function of transmitting messages through a chatroom, in which at least one user account participates, and displays received messages. The chat interface may correspond to a chatroom which is a virtual space in which at least one user account participates and a chat between users takes place.

The map app provided by the server 120 may drive the terminal 110. A user may use the position-based service provided by the server 120 by executing the map app in the terminal 110. The user may generate a user account by subscribing to the position-based service through the map app. The user may use the position-based service through the terminal 110 of the user account subscribing to the position-based service. The terminal 110 of the user account may be a terminal logging in with the user account generated by subscribing to the position-based service.

According to an embodiment, an account of a specific user subscribing to the instant messaging service may be the same as or different from an account of the same user subscribing to the position-based service. For example, the user may use the position-based service by using the user account subscribing to the instant messaging service. Alternatively, the user may use the instant messaging service by using the user account subscribing to the position-based service. For example, the server 120 may distinguish an account of a specific user subscribing to the instant messaging service from an account of the same user subscribing to the position-based service. In addition, the server 120 may distinguish an account of a specific user subscribing to the position-based service from an account of the same user subscribing to the instant messaging service.

Hereinafter, the operation of the instant messaging server that provides the instant messaging service is described by providing the distinction between the map server and the instant messaging server as an example.

Figure 2:
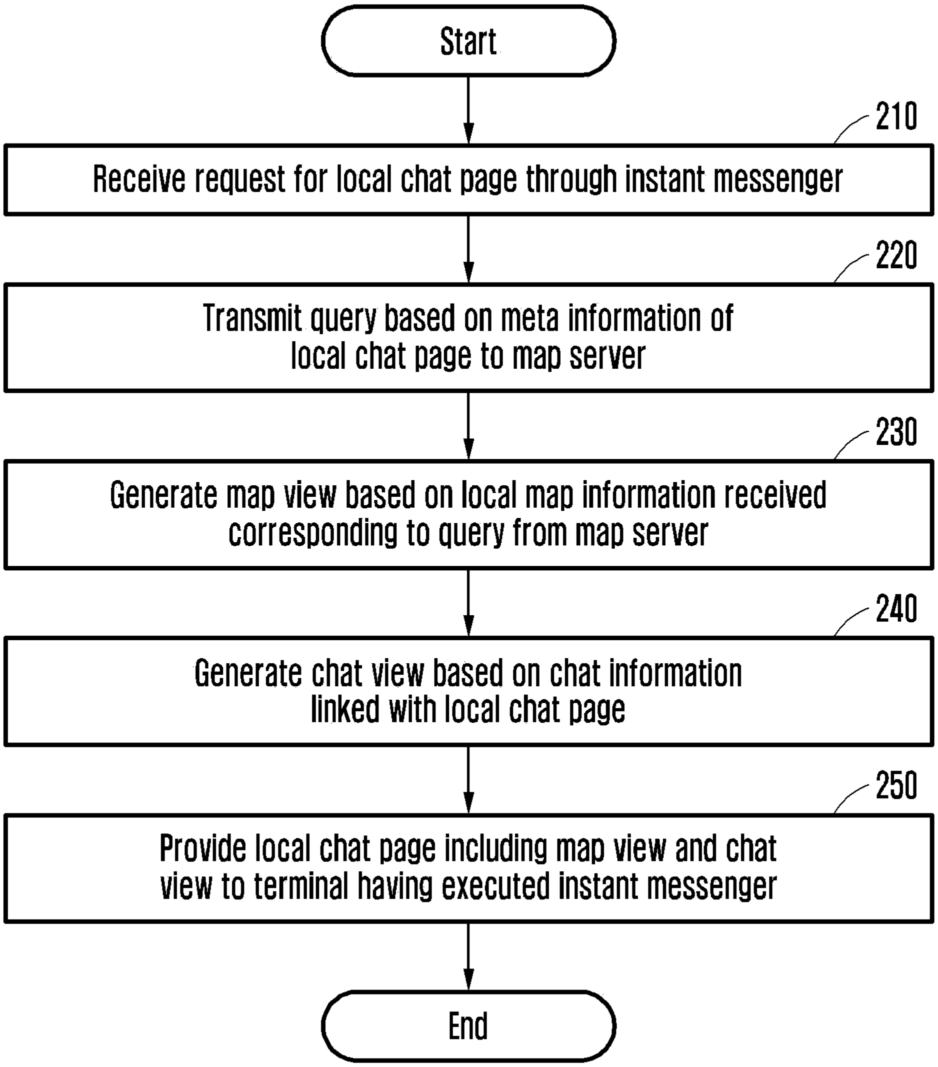
FIG. 2 is a flowchart illustrating an operation of a server that provides the instant messaging service according to an embodiment.

FIG. 2 is a flowchart illustrating an operation of a server that provides the instant messaging service according to an embodiment.

The server that provides the instant messaging service may correspond to the server 120 described above with reference to FIG. 1. Hereinafter, the server that provides the instant messaging service may be briefly referred to as the server.

Referring to FIG. 2, an operating method of the server, according to an embodiment, may include operation 210 of receiving a request for a local chat page through an instant messenger. The request for the local chat page may be received from a terminal for executing the instant messenger. The instant messenger may be logged in with a user account subscribing to the instant messaging service.

The local chat page may be a page including a local chat view and a local map view, or a chat view related to a region and a map view related to the region. The local chat view and the local map view are described in detail below. The local chat page may be mapped to a specific region. The local chat page may include different information depending on the mapped region. For example, information included in a local chat page mapped to a 'Seoul' region may be different from information included in a local chat page mapped to a 'Jeju Island' region. The chat view and the map view of the local chat page may be differently determined depending on the mapped region. For example, the chat view and the map view of the local chat page mapped to the 'Seoul' region may be different from the chat view and the map view of the local chat page mapped to the 'Jeju Island' region.

According to an embodiment, the request for the local chat page may or may not include information for specifying a region. When the request for the local chat page includes the information for specifying a region, the local chat page corresponding to the region specified through the request may be generated and provided in response to the request. When the request for the local chat page does not include the information for specifying a region, a region corresponding to the request may be determined in the server according to predetermined criteria, and the local chat page corresponding to the region determined in the server may be generated and provided in response to the request.

According to an embodiment, the request for the local chat page may be generated by a user's input received through the instant messenger. For example, operation 210 of receiving the request for the local chat page may include an operation of receiving an input of selecting an interfacing object for the local chat page in the instant messenger. In other words, the request for the local chat page may be transmitted to the server by the input of selecting the interfacing object for the local chat page provided through the instant messenger. The interfacing object for the local chat page is described in detail below. For example, when a local keyword is input through an input window (e.g., a search window or a chat window) in the instant messenger, the request for the local chat page mapped to a region corresponding to the input local keyword may be transmitted to the server. For example, the local keyword may include at least one of a name of the region, a name of a landmark of the region, a name of a specific place, and an address. When 'Seoul', which is the name of the specific region, is input through the input window in the instant messenger, the request for the local chat page mapped to the region of the input name may be transmitted to the server.

According to an embodiment, the request for the local chat page may be generated by a state of a terminal having executed the instant messenger or information collected in the terminal. For example, when the position of the terminal is recognized as a position corresponding to the local chat page, the request for the local chat page corresponding to the position of the terminal may be transmitted to the server. The position corresponding to the local chat page may correspond to a position in a region mapped to the local chat page. For example, when the local chat page provided by the server includes the local chat page mapped to 'Seoul' and the local chat page mapped to 'Jeju Island', and the position of the terminal is recognized as corresponding to the 'Seoul' region or to the 'Jeju Island' region, the request for the local chat page corresponding the position of the terminal may be transmitted to the server.

The operating method of the server, according to an embodiment, may include an operation of providing the interfacing object for the request for the local chat page to the terminal, based on whether the position of the terminal is the position corresponding to the local chat page. When the position of the terminal is the position corresponding to the local chat page, the interfacing object for the request for the local chat page may be provided to the terminal through the instant messenger. When the position of the terminal is not the position corresponding to the local chat page, the interfacing object for the request for the local chat page may not be provided. For example, when the local chat page provided by the server includes the local chat page mapped to 'Seoul' and the local chat page mapped to 'Jeju Island', and the position of the terminal is recognized as corresponding to the 'Seoul' region or to the 'Jeju Island' region, the interfacing object for the request for the local chat page may be provided through the instant messenger. On the other hand, when the position of the terminal is recognized as not corresponding to the 'Seoul' region and the 'Jeju Island' region, the interfacing object for the request for the local chat page may not be provided. In other words, when the position of the terminal is the position corresponding to the local chat page, the request for the local chat page may be transmitted to the server by an input of selecting the interfacing object provided to the terminal. On the other hand, when the position of the terminal is not the position corresponding to the local chat page, the request for the local chat page may not be generated.

The operating method of the server, according to an embodiment, may include operation 220 of transmitting a query based on the meta information of the local chat page to a map server. The meta information of the local chat page is information on content or information to be included in the local chat page and may include, for example, local information (e.g., a name of a region or the identification information of the region) mapped to the local chat page.

The map server may include the ranking information of a place object. The ranking information of a place object may correspond to a ranking chart among place objects belonging to the same category or a similar category. The ranking among the place objects may be determined based on data collected about the place objects. The ranking among the place objects may include one or more rankings determined by one or more criteria. For example, the ranking of the place objects may be determined in order of favorites, i.e., the number of users who set the place objects as favorites. For example, the ranking of the place objects may be determined in order of directions, i.e., the number of requesting directions to the place objects. For example, the ranking of the place objects may be determined in order of sharing, i.e., the number of sharing the place objects. For example, the ranking of the place objects may be determined in order of searches, i.e., the number of searches for the place objects.

The map server may provide a map chart corresponding to the query and/or the information (e.g., type, name, address, phone number, rating information of users, description information, ranking information) of registered place objects to the server.

According to an embodiment, operation 220 of transmitting of the query to the map server may include generating the query to request the local map information corresponding to at least one of local information, local level information, place type information, and place ranking criterion information, based on the meta information. Local map information is information for generating a map view and/or information included in the map view and may include at least one of, for example, a map chart corresponding to a region, the information of a place object positioned in the region, and the ranking information of the place object positioned in the region.

For example, the query may include the query for requesting a map chart corresponding to local information mapped to the local chat page. For example, the query may include the query for requesting the map chart including a range corresponding to any one of a first local level (e.g., nationwide), a second local level (e.g., state/province), a third local level (e.g., city/county/district), and a fourth local level (e.g., town/village). For example, the query may include the query for requesting the information of place objects of a specific place type (e.g., a restaurant, a cafe, a beauty salon, a park, etc.) positioned in the region mapped to the local chat page. For example, the query may include the query for requesting the ranking information of a place object positioned in the region mapped to the local chat page determined according to place ranking criteria (e.g., in order of favorites, searches, sharing, or directions).

The operating method of the server, according to an embodiment, may include operation 230 of generating a map view based on the local map information received corresponding to the query from the map server. For example, the local map information, as information corresponding to the query received from the map server, may include at least one of a map chart of a region corresponding to the local chat page, the information of a place object positioned in the region, and the ranking information of the place object positioned in the region. In other words, operation 230 of generating the map view may include generating the map view including at least one of a map chart of a region corresponding to the local chat page, the information of a place object positioned in the region, and the ranking information of the place object positioned in the region. The map view is described in detail below.

The operating method of the server, according to an embodiment, may include operation 240 of generating a chat view based on chat information linked with the local chat page. The chat information linked with the local chat page may include information on a chatroom linked with the local chat page and/or information on a message linked with the local chat page. The chatroom linked with the local chat page may correspond to a chatroom about the region mapped to the local chat page. The message linked with the local chat page may include a message about the region mapped to the local chat page and/or a message transmitted through the chatroom linked with the local chat page.

According to an embodiment, operation 240 of generating the chat view may include determining a target chatroom based on the chat information linked with the local chat page and generating the chat view including information on the target chatroom. The target chatroom may include the chatroom about the region mapped to the local chat page. The target chatroom may be a specific type of chatroom. For example, the target chatroom may be a group chatroom type accessible through a link.

For example, the determining of the target chatroom may include determining a chatroom, including local information corresponding to the local chat page as a keyword, as the target chatroom. A chatroom including, as a name of the region mapped to the local chatroom, at least one of a name (or a title) of the chatroom, the introduction information of the chatroom, the theme information of the chatroom, and the tag information of the chatroom may be determined as the target chatroom.

For example, the determining of the target chatroom may include determining the chatroom mapped to the local chat page as the target chatroom. One or more chatrooms may be mapped to the local chat page. A chatroom mapped to the local chat page may be determined as the target chatroom.

For example, the target chatroom may be determined based on the participant information of the chatroom. When a residence region, a living region, a region of interest, or a region of work of participant(s) of the chatroom corresponds to the region mapped to the local chat page, the chatroom may be determined as the target chatroom. Alternatively, when the position of a terminal of participant(s) of the chatroom corresponds to the region mapped to the local chat page, the chatroom may be determined as the target chatroom. Alternatively, when the chatroom is generated, and the position of a terminal having requested the generation of the chatroom corresponds to the region mapped to the local chat page, the chatroom may be determined as the target chatroom.

According to an embodiment, the determining of the target chatroom may include determining the target chatroom based further on the chat participation history of a user account. A user account may refer to a user account logging in with a terminal transmitting the request for the local chat page through the instant messenger. Among chatrooms linked with the local chat page, a chatroom where a user account has participated and/or a chatroom where the user account is participating may be determined as the target chatroom.

The chat view may include information on the target chatroom. The information on the target chatroom may include at least one of link information leading to the target chatroom, an interfacing object for requesting participation in the target chatroom, a name of the target chatroom, and the introduction information of the target chatroom. The information on the target chatroom may include message information transmitted through the target chatroom. The information on the target chatroom may include the content of a message or content included in the message.

According to an embodiment, operation 240 of generating the chat view may include generating the chat view including a message transmitted through a chatroom linked with the local chat page. For example, operation 240 of generating the chat view may include generating the chat view in which messages transmitted in a chatroom linked with the local chat page are sorted in order of the most recently transmitted messages. The chat view may display n messages (here, n is a natural number) recently transmitted in the chatroom linked with the local chat page. All or part of the content of the message may be displayed through the chat view. For example, text having a certain size or a certain number of letters of text included in the message may be displayed through the chat view. All or part of the content included in the message may be displayed through the chat view.

For example, operation 240 of generating the chat view may include generating the chat view in which messages transmitted in a chatroom linked with the local chat page are sorted in order of importance. The importance of messages may correspond to a quantitative indicator for how important the messages determined according to predetermined criteria are. For example, the importance of the messages may be determined based on the relevance between local information mapped to the local chat page and the messages. When a message includes or is about local information, the importance of the message may be determined to have a higher value than a message that does not include or is not about local information. For example, the importance of the messages may be determined based on the degree of participants' reactions to the messages in the chatroom. As the number of viewing a message, the number of liking the message, the number of storing the message, or the number of sharing the message is greater, the degree of the participants' reactions to the message is determined to be higher. As the degree of the participants' reactions to the message is higher, the importance of the message is determined to have a higher value. For example, the importance of a message may be determined based on the activity intensity of a user account writing the message. The activity intensity of a user account writing a message may be determined to be higher as the number of transmitting the message through a chatroom of the user account, the reaction of the message transmitted through the chatroom, or the number of reacting to the message transmitted through the chatroom is greater. As the activity intensity of a user account writing a message is greater, the importance of the message may be determined to have a higher value. For example, the importance of a message may be determined based on the time when the message is transmitted. As the time when the message is transmitted is more recent, the importance of the message may be determined to have a higher value.

The operating method of the server, according to an embodiment, may include operation 250 of providing a local chat page including a map view and a chat view to a terminal having executed an instant messenger. The terminal having executed the instant messenger may display the local chat page. The map view corresponding to a region and the chat view corresponding to the region may be displayed in the terminal through the local chat page. The local chat page is described in detail below.

When a map server is not distinguished from an instant messaging server, the instant messenger described above with reference to FIG. 2 may correspond to the instant messenger and/or a map app. Operations 220 and 230 of FIG. 2 may correspond to an operation of obtaining local map information corresponding to a query based on the meta information of a local chat page and an operation of generating a map view based on the obtained local map information.

Figure 3A:
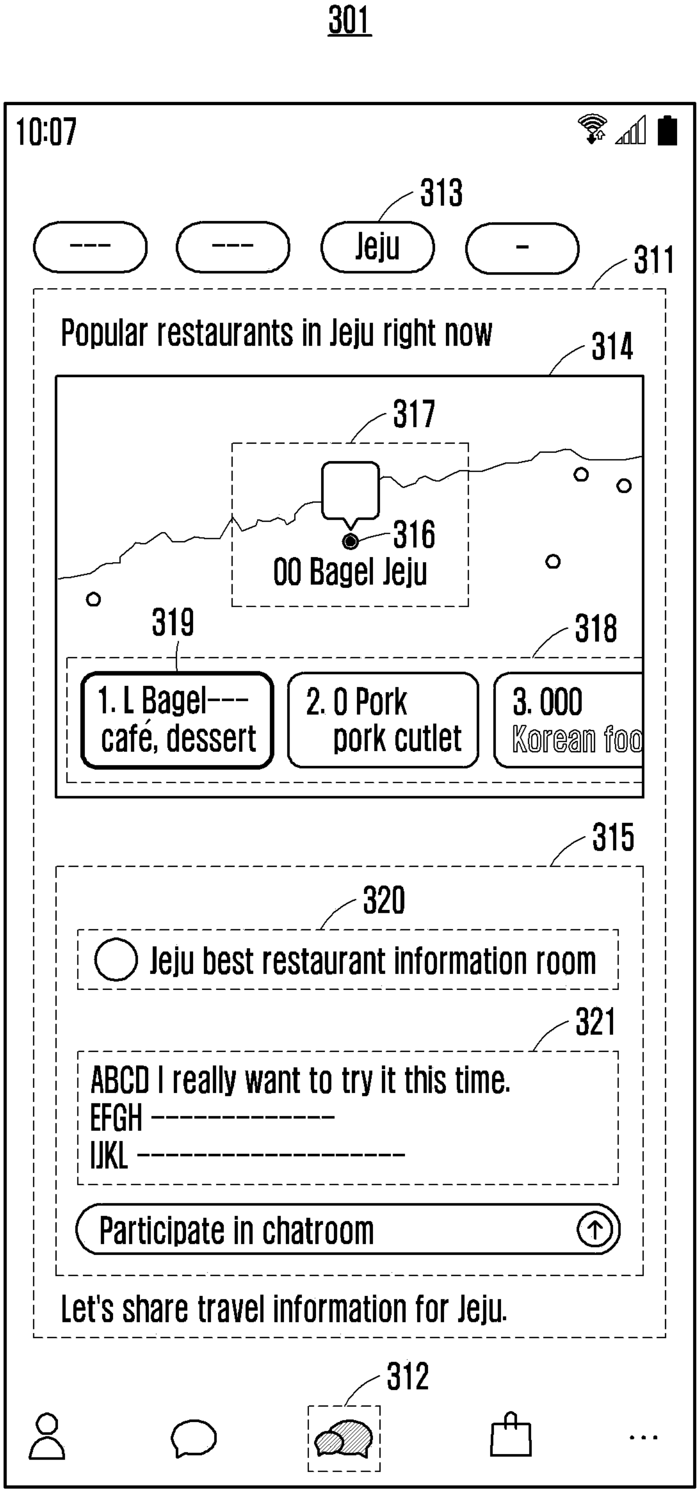
FIGS. 3A to 3C are diagrams each illustrating a screen of a terminal displaying a local chat page according to an embodiment.
Figure 3B:
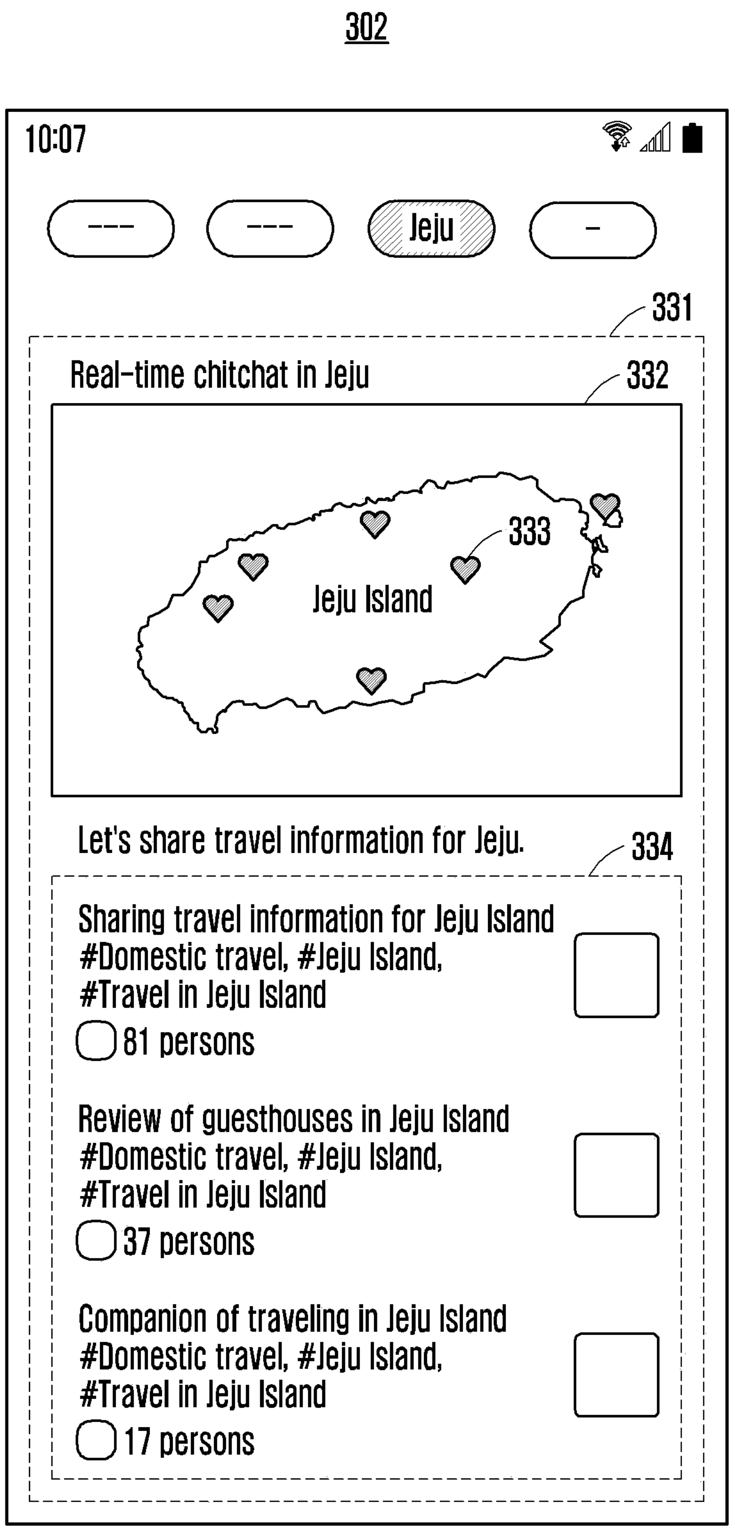
Figure 3C:
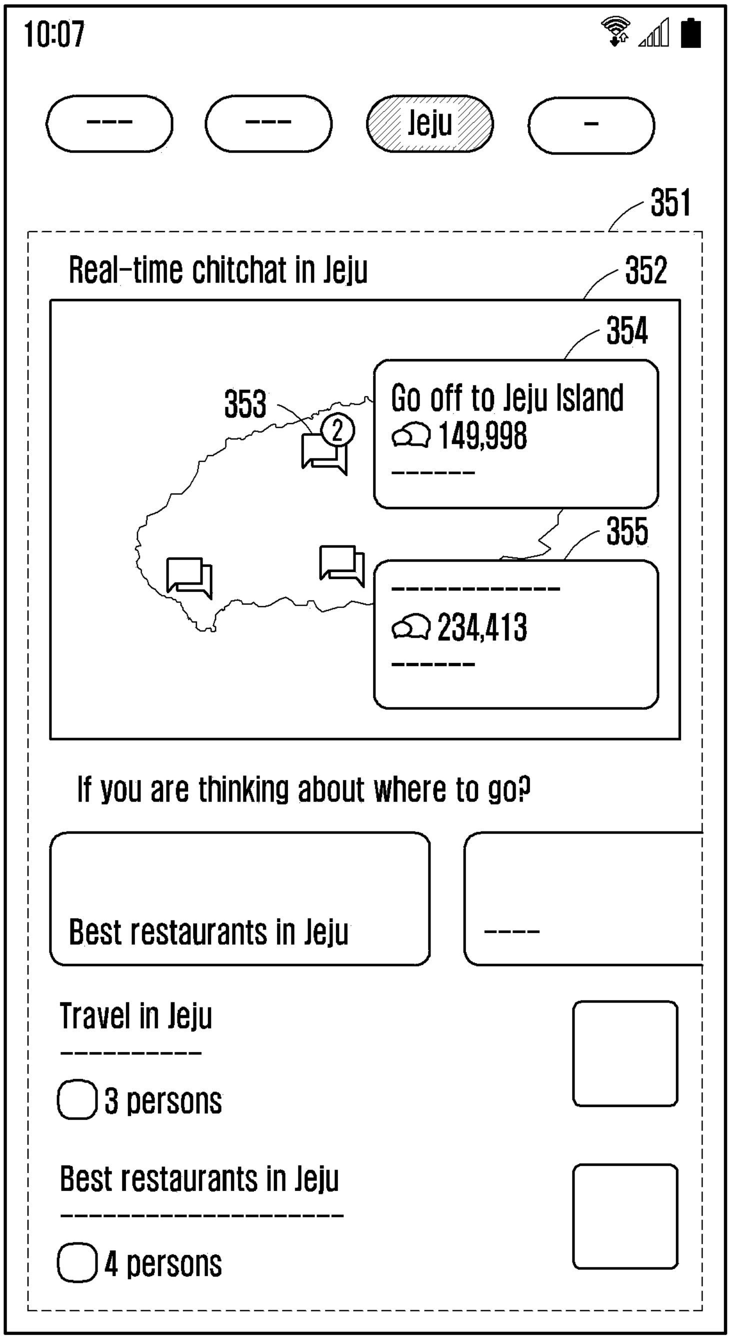

FIGS. 3A to 3C are diagrams each illustrating a screen of a terminal displaying a local chat page according to an embodiment.

Referring to screen 301 of FIG. 3A, a local chat page 311 may be displayed in a tab 312 in an instant messenger. For example, the local chat page 311 may be displayed in the terminal by an input of selecting an interfacing object 313 for requesting the local chat page 311. The interfacing object 313 may include a region name (e.g., 'Jeju Island'). When receiving the input of selecting the interfacing object 313, the local chat page 311 mapped to a region (e.g., 'Jeju Island') corresponding to the interfacing object 313 may be provided. The local chat page 311 may include a map view 314 and a chat view 315 corresponding to the mapped region. Hereinafter, the region mapped to the local chat page 311 may be referred to as a target region.

The map view 314 may include a map chart corresponding to the target region. The position of a place object positioned in the target region may be displayed in the map chart. For example, when selecting a position 316 of a first place object displayed in the map chart, the information of the first place object may be displayed in the map chart. For example, a name of the first place object and an icon 317 including an image may be displayed in the map chart. In addition, the information, including at least one of the type, address, and description information of the first place object, of the first place object may be displayed in the map chart.

A ranking chart 318 of place objects may be provided together with the map chart through the map view 314. The ranking chart 318 of place objects may include the information (e.g., the name or type of a place) of the place objects together with the ranking information of the place objects positioned in the target region. The ranking chart 318 of place objects may include a list of place objects in which the information of the place objects corresponding to high rankings (e.g., top 10) among the place objects positioned in the target region is sorted in order of rankings.

When receiving an input of selecting an item of a place object in the ranking chart 318, the position of the place object corresponding to the item selected in the map chart may be focused. For example, when receiving an input of selecting an item 319 of the first place object in the ranking chart 318, the position of the place object corresponding to the item selected in the map chart may be focused. For example, the icon 317 including the information of the first place object may be added to the position of the first place object corresponding to the item 319 selected in the map chart. For example, the position of a place object of a high ranking may be displayed as a first figure in the map chart, and the position of the first place object corresponding to the selected item 319 may be displayed as a second figure. The second figure may be displayed to distinguish the position of the first place object corresponding to the selected item 319 from the position of an unselected place object of a high ranking. The second figure may have a greater size than that of the first figure, may have a different color, may correspond to a different figure, or may correspond to a figure to which a special effect (e.g., an animation effect) is added. For example, when the item of the first place object is selected, the figure added to the position of the first place object may be changed from the first figure to the second figure. For example, the map chart may be moved such that the position of the first place object corresponding to the selected item 319 may be centered.

The chat view 315 may include information on a chatroom linked with the local chat page 311. The chatroom linked with the local chat page 311 is a chatroom about the target region and may include, for example, a chatroom for sharing the information about best restaurants in a region. For example, the chat view 315 may include a name 320 of the chatroom linked with the local chat page 311 and a list 321 of messages transmitted through the chatroom linked with the local chat page 311.

The messages of the chatroom linked with the local chat page 311 may be displayed in order of the most recently transmitted messages through the list 321 of the messages of the chat view 315. The messages displayed in the list 321 of the messages of the chat view 315 may be updated whenever a new message is transmitted through the chatroom linked with the local chat page 311. On the other hand, as described above, the messages of the chatroom linked with the local chat page 311 may be displayed in order of importance through the list 321 of the messages of the chat view 315.

Referring to screen 302 of FIG. 3B, a local chat page 331 may include a map view 332 corresponding to the target region. The map view 332 may display the positions of one or more place objects of interest in the target region. For example, the place objects of interest may include at least one of place objects in high rankings (e.g., top 10) among the place objects of the target region, place objects corresponding to landmarks of the target region, and place objects designated by a user account of a terminal as places of interest. As described above with reference to FIG. 3A, when selecting a position (e.g., a position 333 of a second place object) of a place object displayed in the map chart, the information of the place object may be displayed in the map chart.

The local chat page 331 may include a chat view 334 corresponding to the target region. The chat view 334 may include a list of chatrooms linked with the local chat page 331. The list of chatrooms may include items of one or more target chatrooms determined based on chat information linked with the local chat page. As described above, the target chatrooms may include at least one of a chatroom mapped to the local chat page 331, a chatroom including the information (e.g., the name of the target region) of the target region as a keyword, and a chatroom including participants related to the target region. For example, the list of chatrooms may include some target chatrooms selected from among the target chatrooms. A target chatroom to be included in the list of chatrooms may be selected based at least one of the number of transmitting messages in a target chatroom, the number of recently transmitted messages in the target chatroom, and the number of participants of the target chatroom.

Referring to screen 303 of FIG. 3C, a local chat page 351 may include a map view 352 corresponding to the target region. The map view 352 may display the position of a chatroom linked with the local chat page 351. For example, the position of a chatroom may be determined as the position of a terminal having transmitted a recent message to the chatroom. For example, when a chatroom is generated, the position of the chatroom may be determined as the position of a terminal having requested the generation of the chatroom. For example, when selecting a position 353 of a first chatroom displayed in the map view 352, information on the first chatroom may be displayed. For example, when selecting the position 353 of the first chatroom, the name of the first chatroom, the number of messages transmitted through the first chatroom, and an icon 354 including the theme information of the first chatroom may be displayed. In addition, the map view 352 may be displayed through at least one of the number of participants in the first chatroom and tag information included in the first chatroom.

For example, when the position 353 of the first chatroom is the same as the position of a second chatroom, and when selecting the position 353 of the first chatroom, the name of the second chatroom together with the icon 354 corresponding to the first chatroom, the number of messages transmitted through the second chatroom, and an icon 355 including the theme information of the second chatroom may be displayed.

Figure 4:
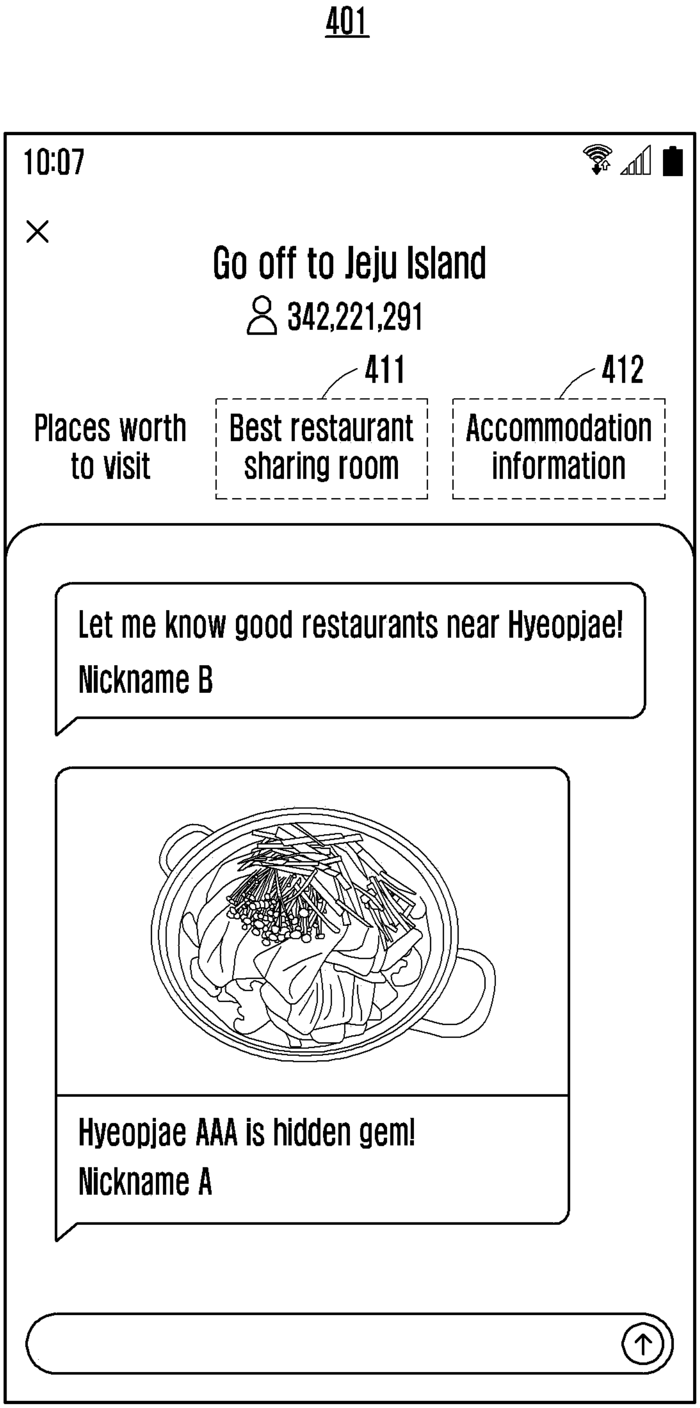
FIG. 4 is a diagram illustrating a chat window screen of a chatroom linked with the local chat page according to an embodiment.

FIG. 4 is a diagram illustrating a chat window screen of a chatroom linked with the local chat page according to an embodiment.

For example, screen 401 of a chat window of a chatroom linked with the local chat page of FIG. 4 may be displayed by an input of selecting an item of a chatroom displayed in the icon 355 including the theme information of the second chatroom or the icon 354 including the theme information of the first chatroom of FIG. 3C or the chat view 315 of FIG. 3A.

Referring to screen 401 of the chat window of FIG. 4, a message transmitted through the chatroom linked with the local chat page may be displayed on the chat window.

For example, the chatroom linked with the local chat page may include one or more sub-chatrooms. The sub-chatrooms may correspond to separate chat spaces in one chatroom. For example, when selecting a 'best restaurant sharing room' tab 411 of screen 401 of the chat window, a chat window of a sub-chatroom for sharing the best restaurants may be displayed. For example, when selecting an 'accommodation information' tab 412 of screen 401 of the chat window, a chat window of a sub-chatroom for sharing accommodation information may be displayed. The sub-chatroom for sharing the best restaurants and the sub-chatroom for sharing accommodation information in the chatroom linked with the local chat page may be different chat spaces.

Figure 5A:
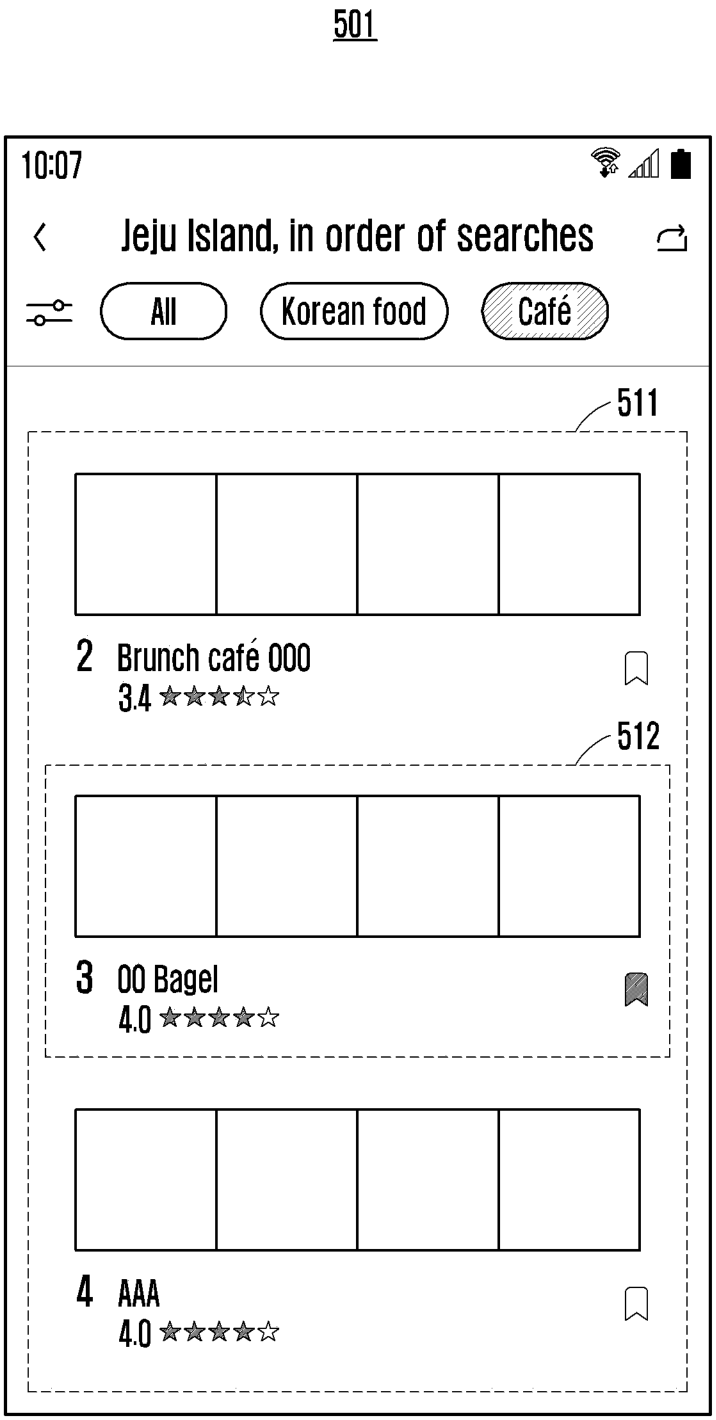
FIGS. 5A and 5B are diagrams each illustrating a screen of a map app linked with the instant messaging service according to an embodiment.
Figure 5B:
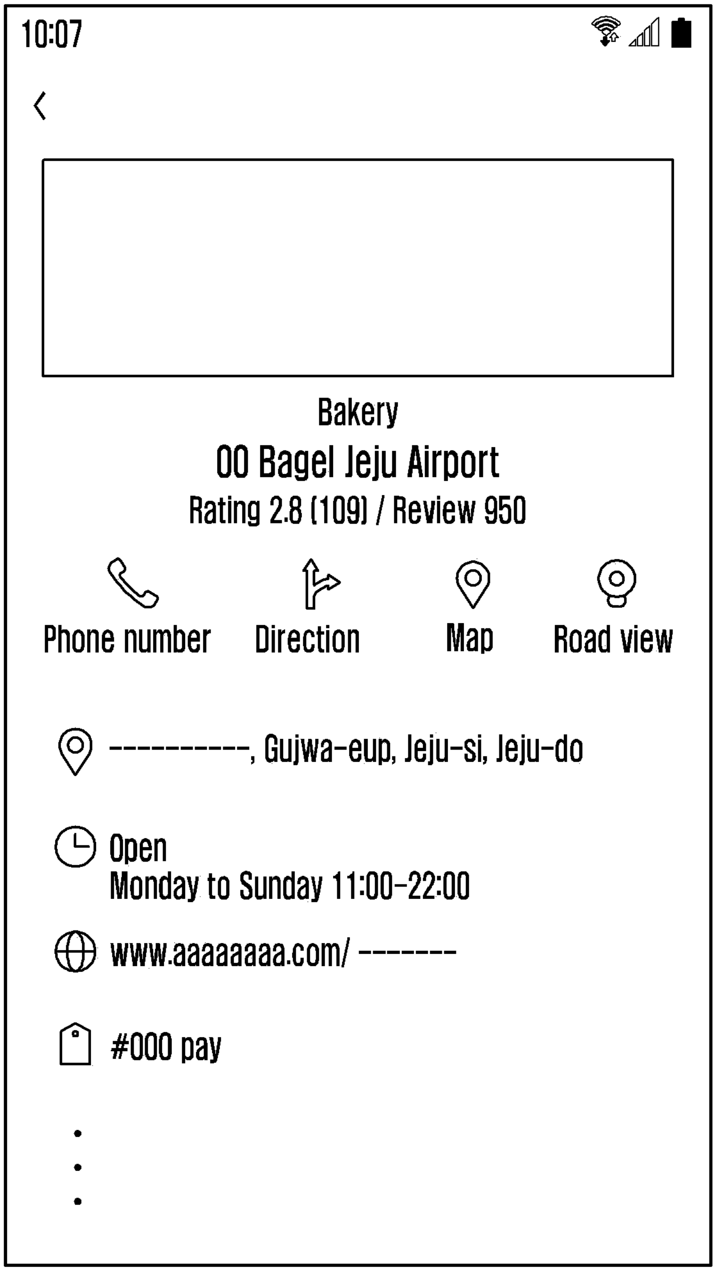

FIGS. 5A and 5B are diagrams each illustrating a screen of a position-based service linked with the instant messaging service according to an embodiment.

For example, a map app linked with the instant messaging service may be executed in a terminal through a map view of an instant messenger. The map app linked with the instant messaging service may be an app for a position-based service provided in a map server. For example, a web view for a position-based service may be displayed through the map view of the instant messenger.

For example, the map app may be executed by an input of selecting the icon 317 displaying the information of the first place object displayed in the map view 314 of FIG. 3A such that screen 501 of FIG. 5A may be displayed.

Referring to screen 501 of FIG. 5A, a ranking chart 511 of place objects positioned in a target region may be displayed through the map app. The ranking chart 511 may include items of place objects sorted in order of rankings. The ranking chart 511 may correspond to a ranking chart (e.g., the ranking chart 318 of FIG. 3A) provided through the map view of the instant messenger. For example, screen 501 of FIG. 5A displayed by the input of selecting the icon 317 displaying the information of the first place object may be a screen of the ranking chart 511 including an item 512 of the first place object.

For example, when selecting the item 512 of the first place object included in the ranking chart 511, screen 501 may be switched to screen 502 illustrated in FIG. 5B. Screen 502 of FIG. 5B may include a detail page of the first place object corresponding to the selected item 512. The detail page of the first place object may include the information of the first place object. For example, the detail page of the first place object may include at least one of the type of a place object, a name, an address, a phone number, a rating information of a user, and description information.

Figure 6:
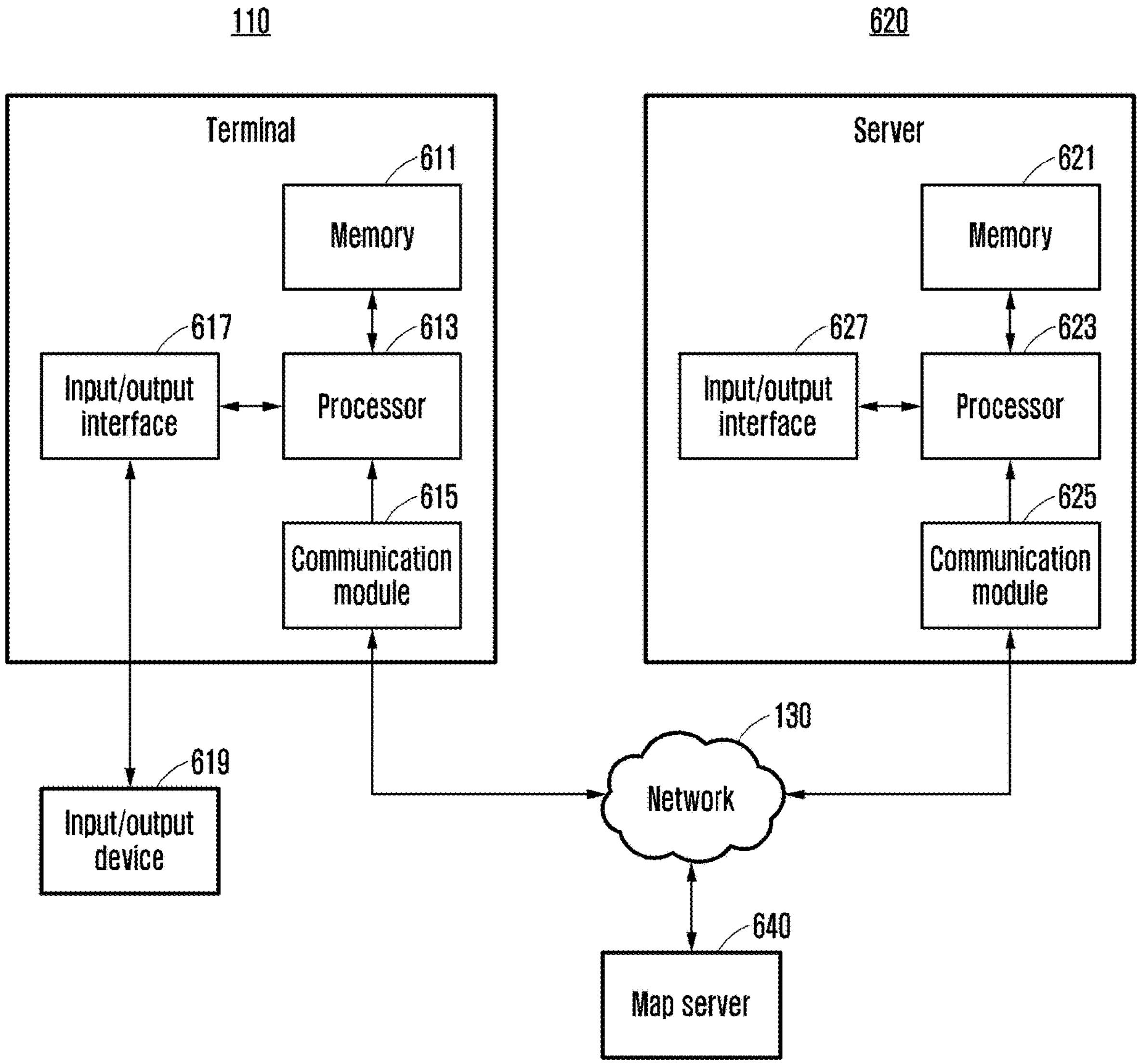
FIG. 6 is a diagram illustrating a hardware configuration of a system for the instant messaging service according to an embodiment.

FIG. 6 is a diagram illustrating a hardware configuration of a system for the instant messaging service according to an embodiment.

Referring to FIG. 6, the system (e.g., the system 100 of FIG. 1), according to an embodiment, may include the terminal 110 and a server 620 connected through the network 130. The system, according to an embodiment, may include a map server 640 connected to the terminal 110 and the server 620 through the network 130. As described above, the server 620 and the map server 640 may correspond to the server 120 of FIG. 1.

The terminal 110 may be a mobile terminal implemented as a computer device. For example, the terminal 110 may communicate with the server 620 and the map server 640 through the network 130 by using a wired or wireless communication method and may communicate with other electronic devices not shown in FIG. 6.

The server 620 may be implemented as one or more computer devices providing commands, code, files, content, services, and the like by communicating with the terminal 110 and/or another server including the map server 640 through the network 130. A communication method may not be limited and may include a communication method using a communication network (e.g., a mobile communication network, wired Internet, wireless Internet, and a broadcasting network) that may be included in the network 130 and a short-distance wireless communication method between devices. For example, the network 130 may include one or more networks among networks, such as a personal area network (PAN), a local area network (LAN), a campus area network (CAN), a metropolitan area network (MAN), a wide area network (WAN), a broadband network (BBN), the Internet, and the like.

According to an embodiment, the server 620 may provide a file for installing an application to the terminal 110 accessing the server 120 through the network 130. In this case, the terminal 110 may install the application (e.g., an instant messenger) by using the file provided by the server 620. In addition, by control of an operating system (OS) and at least one program (e.g., a browser or an installed application) that are included by the terminal 110, the terminal 110 may access the server 620 and receive a service or content provided by the server 620. For example, when the terminal 110 transmits a service request message to the server 620 through the network 130 by control of the application, the server 620 may transmit a response message corresponding to the service request message to the terminal 110 and the terminal 110 may provide a user with content by composing and displaying a screen according to the response message.

According to an embodiment, the terminal 110 and the server 620 may respectively include memories 611 and 621, processors 613 and 623, communication modules 615 and 625, and input/output interfaces 617 and 627.

The processors 613 and 623 may perform at least one operation described above with reference to FIGS. 1 to 5. The processor 613 may perform at least one operation performed in the instant messenger installed in the terminal 110 described above with reference to FIGS. 1 to 5. For example, the processor 613 may request a local chat page from the server 620 and may display the local chat page, including a chat view and a map view, received from the server 620. The processor 623 may perform at least one operation for the instant messaging service described above with reference to FIGS. 1 to 5. For example, the processor 623 may perform at least one of an operation of receiving a request for a local chat page through an instant messenger, an operation of transmitting a query based on the meta information of the local chat page to a map server, an operation of generating a map view based on local map information received from the map server in response to the query, an operation of generating a chat view based on chat information linked with the local chat page, and an operation of providing the local chat page including the map view and the chat view to a terminal having executed the instant messenger.

The processors 613 and 623 may be configured to process commands of a computer program by performing basic arithmetic, logic, and an input/output operation. The commands may be provided to the processors 613 and 623 by the memories 611 and 621 or the communication modules 615 and 625.

The memories 611 and 621 may be a computer-readable storage medium, which may be volatile or non-volatile memory. The memories 611 and 621 may store information for driving the instant messenger described above with reference to FIGS. 1 to 5. For example, the memory 621 may store the information of user accounts having subscribed to the instant messaging service and the information of chatrooms.

The memory 611 may include code for the instant messenger that is installed to be driven in the terminal by files provided by the server 620 through the network 130.

The memory 621 may store a program implementing operations for the instant messaging service described above with reference to FIGS. 1 to 5.

The communication modules 615 and 625 may provide a function for the terminal 110 and the server 620 to communicate with each other through the network 130 and a function for the terminal 110 and the server 620 to communicate with another electronic device or another server (e.g., the map server 640) through the network 130.

For example, a request generated by the processor 613 of the terminal 110 according to program code on an instant messenger stored in a storage medium, such as the memory 611, may be transmitted to the server 620 through the network 130 by control of the communication module 615.

For example, control signals, commands, content, files, and the like provided by control of the processor 623 of the server 620 may be received by the terminal 110 through the communication module 615 of the terminal 110 after passing through the communication module 625 and the network 130.

The input/output interfaces 617 and 627 may be a tool for interfacing with an input/output device 619. For example, an input device may include a device, such as a keyboard or a mouse, and an output device may include a device, such as a display for displaying a communication session of an application. In another example, the input/output interface 617 may be an interface with a device having input and output functions, such as a touch screen. Specifically, for example, when the processor 613 of the terminal 110 processes commands of a computer program loaded in the memory 611, content or a service screen configured by using data provided by the server 620 may be displayed on a display through the input/output interface 617. An input received from the user through the input/output device 619 may be provided in a processable form in the processor 613 of the terminal 110 through the input/output interface 617.

According to an embodiment, the system may further include a database linked with the server 620 and/or the map server 640. The database may include information to generate a map view or a map chart, like local map information. The server 620 and/or the map server 640 may obtain information to generate the map view or the map chart from the database.

According to an embodiment, the terminal 110, the server 620, and the map server 640 may further include other components that are not illustrated in FIG. 6. For example, the terminal 110 may be implemented to include at least a part of the input/output device 619 described above or may further include other components, such as transceivers, global positioning system (GPS) modules, cameras, various types of sensors, databases, and the like.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an OS and one or more software applications that run on the OS. The processing unit also may access, store, manipulate, process, and generate data in response to execution of the software. For purpose of simplicity, the description of a processing unit is used as singular; however, one skilled in the art will appreciate that a processing unit may include multiple processing elements and multiple types of processing elements. For example, the processing unit may include a plurality of processors, or a single processor and a single controller. In addition, different processing configurations are possible, such as parallel processors.

The software may include a computer program, a piece of code, an instruction, or some combination thereof, to independently or collectively instruct or configure the processing unit to operate as desired. Software and data may be stored in any type of machine, component, physical or virtual equipment, or computer storage medium or device capable of providing instructions or data to or being interpreted by the processing unit. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), randomaccess memory (RAM), flash memory, and the like. Examples of program instructions include both machine code, such as produced by a compiler, and files containing higher-level code that may be executed by the computer using an interpreter.

The above-described devices may act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An operating method of a server that provides an instant messaging service, the operating method comprising:

receiving a request for a local chat page through an instant messenger;

identifying meta information of the local chat page;

transmitting a query generated based on the identified meta information to a map server;

generating a map view based on local map information received from the map server in response to the query;

generating a chat view based on chat information linked with the local chat page;

wherein the generating of the chat view comprises providing a plurality of sub-chatrooms representing separate chat spaces within a single chatroom linked with the local chat page, and wherein each of the plurality of sub-chatrooms is associated with at least a portion of the identified meta information; and providing the local chat page comprising the map view and the chat view to a terminal having executed the instant messenger, wherein the meta information represents a subject or topic of the chat information and includes at least one of a keyword, a place name, or a category identified from the chat information.

2. The operating method of claim 1, wherein the transmitting the query to the map server comprises:

generating the query to request the local map information corresponding to at least one of local information, local level information, place type information, or place ranking criterion information, based on the meta information.

3. The operating method of claim 1, wherein the generating the map view comprises:

generating the map view comprising at least one of a map chart of a region corresponding to the local chat page, information of a place object positioned in the region, or ranking information of the place object positioned in the region.

4. The operating method of claim 1, wherein the generating the chat view comprises:

determining a target chatroom based on the chat information linked with the local chat page; and generating the chat view comprising information on the target chatroom, wherein the determining the target chatroom comprises:

determining the target chatroom based further on a chat participation history of a user account;

determining a chatroom mapped to the local chat page as the target chatroom; or determining a chatroom, comprising local information corresponding to the local chat page as a keyword, as the target chatroom.

5. The operating method of claim 1, wherein the generating of the map view comprises providing a ranking chart of place objects determined based on the query, wherein, in response to receiving an input selecting an item in the ranking chart, the server updates the map view by centering on a corresponding place object and changing a display of the place object, and transmits and updated query to the map server based on the selected item.

6. The operating method of claim 1, wherein the generating the chat view comprises:

generating the chat view comprising a message transmitted through a chatroom linked with the local chat page.

7. The operating method of claim 1, wherein the generating the chat view comprises at least one of:

generating the chat view in which messages transmitted in a chatroom linked with the local chat page are sorted in order of the most recently transmitted messages; or generating the chat view in which the messages transmitted in a chatroom linked with the local chat page are sorted in order of importance.

8. A non-transitory computer-readable storage medium storing instructions that, when executed by a processor, cause the processor to perform the operating method of claim 1.

9. An operating method of a terminal configured to execute an instant messenger, the operating method comprises:

requesting a local chat page from a server through the instant messenger; and displaying the local chat page, comprising a chat view and a map view, as a response to a request of the local chat page, wherein the map view is generated based on local map information corresponding to a query based on meta information of the local chat page identified by the server, wherein the chat view is generated based on the chat information linked with the local chat page, and comprises a plurality of sub-chatrooms representing separate chat spaces within a single chatroom, wherein each of the plurality of sub-chatrooms is associated with at least a portion of the identified meta information, and wherein the meta information represents a subject or topic of the chat information and includes at least one of a keyword, a place name, or a category identified from the chat information.

10. The operating method of claim 9, wherein the requesting the local chat page comprises:

requesting the local chat page through an input of selecting an interfacing object for the local chat page in the instant messenger.

11. The operating method of claim 9, wherein the requesting the local chat page comprises:

requesting the local chat page through an interfacing object provided based on whether a position of the terminal corresponds to the local chat page.

12. A server that provides an instant messaging service, the server comprising a processor configured to receive a request for a local chat page through an instant messenger, identify meta information of the local chat page;

transmit a query generated based on the identified meta information to a map server, generate a map view based on local map information received from the map server in response to the query, generate a chat view based on chat information linked with the local chat page, wherein generating the chat view comprises providing a plurality of sub-chatrooms representing separate chat spaces within a single chatroom, and wherein each of the plurality of sub-chatrooms is associated with at least a portion of the identified meta information; and provide the local chat page comprising the map view and the chat view to a terminal having executed the instant messenger, wherein the meta information represents a subject or topic of the chat information and includes at least one of a keyword, a place name, or a category identified from the chat information.

13. The server of claim 12, wherein the processor is further configured to, when transmitting the query to the map server, generate the query to request the local map information corresponding to at least one of local information, local level information, place type information, and or place ranking criterion information, based on the meta information.

14. The server of claim 12, wherein the processor is further configured to, when generating the map view, generate the map view comprising at least one of a map chart of a region corresponding to the local chat page, information of a place object positioned in the region, or ranking information of the place object positioned in the region.

15. The server of claim 12, wherein the processor is further configured to, when generating the chat view, determine a target chatroom based on the chat information linked with the local chat page, and generate the chat view comprising information on the target chatroom, wherein the processor is further configured to, when determining the target chatroom, determine a chatroom mapped to the local chat page as the target chatroom, or determine a chatroom, comprising local information corresponding to the local chat page as a keyword, as the target chatroom.

16. The server of claim 12, wherein the generating of the map view comprises providing a ranking chart of place objects determined based on the query, wherein, in response to receiving an input selecting an item in the ranking chart, the server updates the map view by centering on a corresponding place object and changing a display of the place object, and transmits and updated query to the map server based on the selected item.

17. The server of claim 15, wherein the processor is further configured to, when determining the target chatroom, determine the target chatroom based further on a chat participation history of a user account.

18. The server of claim 12, wherein the processor is further configured to, when generating the chat view, generate the chat view comprising a message transmitted through a chatroom linked with the local chat page.

19. The server of claim 12, wherein the processor is further configured to, when generating the chat view, generate the chat view in which messages transmitted in a chatroom linked with the local chat page are sorted in order of the most recently transmitted messages, and generate the chat view in which the messages transmitted in a chatroom linked with the local chat page are sorted in order of importance.

20. The server of claim 12, wherein the processor is further configured to, when receiving the request for the local chat page, receive an input of selecting an interfacing object for the local chat page in the instant messenger.

* * * * *